Figure 1:
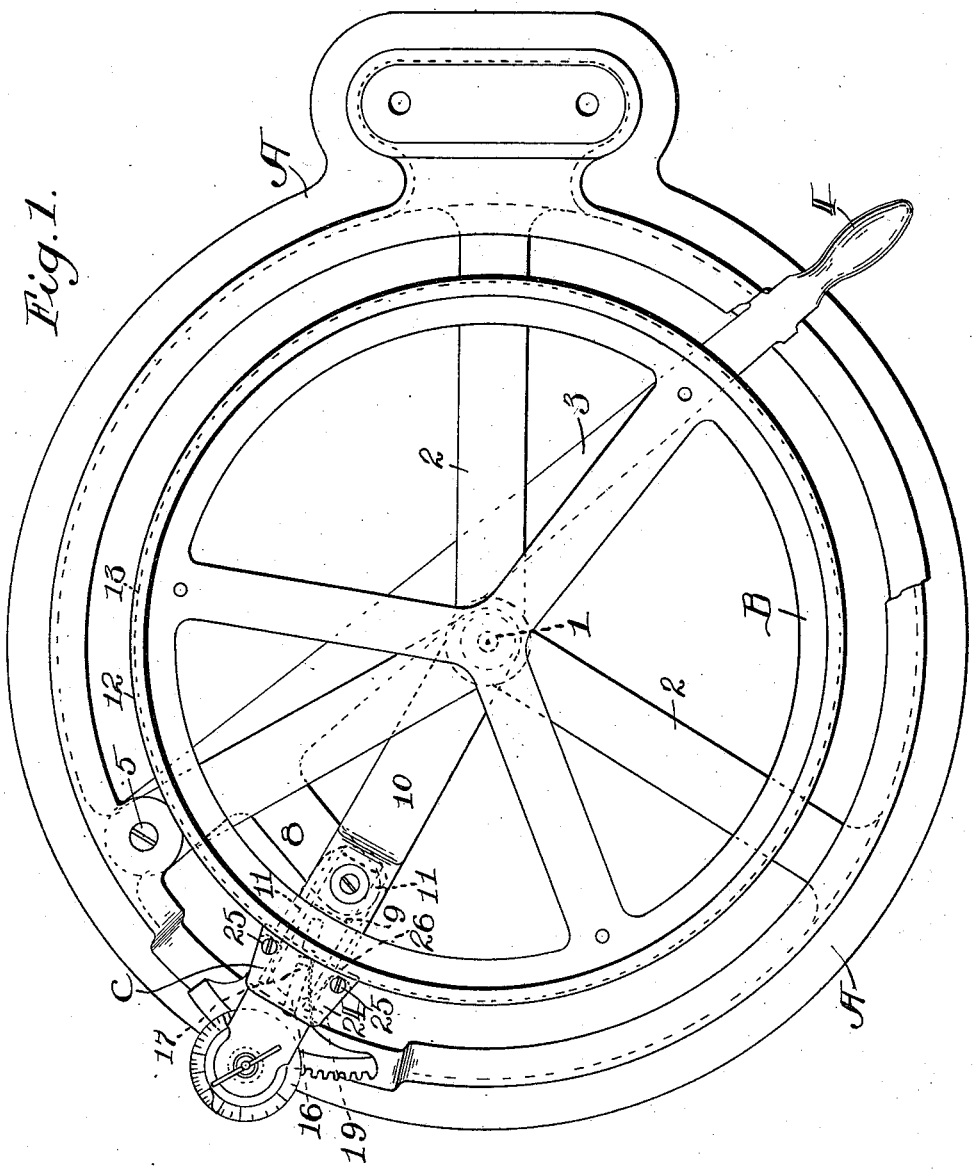

G. F. KRIESEL.
CLUTCH FOR CHEESE CUTTERS.
APPLICATION FILED JULY 8, 1907.

1,014,652.

Patented Jan. 16, 1912.
2 SHEETS—SHEET 1.

Witnesses:

Inventor:
Gustave F. Kriesel,
by: John E. Stryker
Attorney.

G. F. KRIESEL.
CLUTCH FOR CHEESE CUTTERS.
APPLICATION FILED JULY 8, 1907.
1,014,652.
Patented Jan. 16, 1912.
2 SHEETS—SHEET 2.
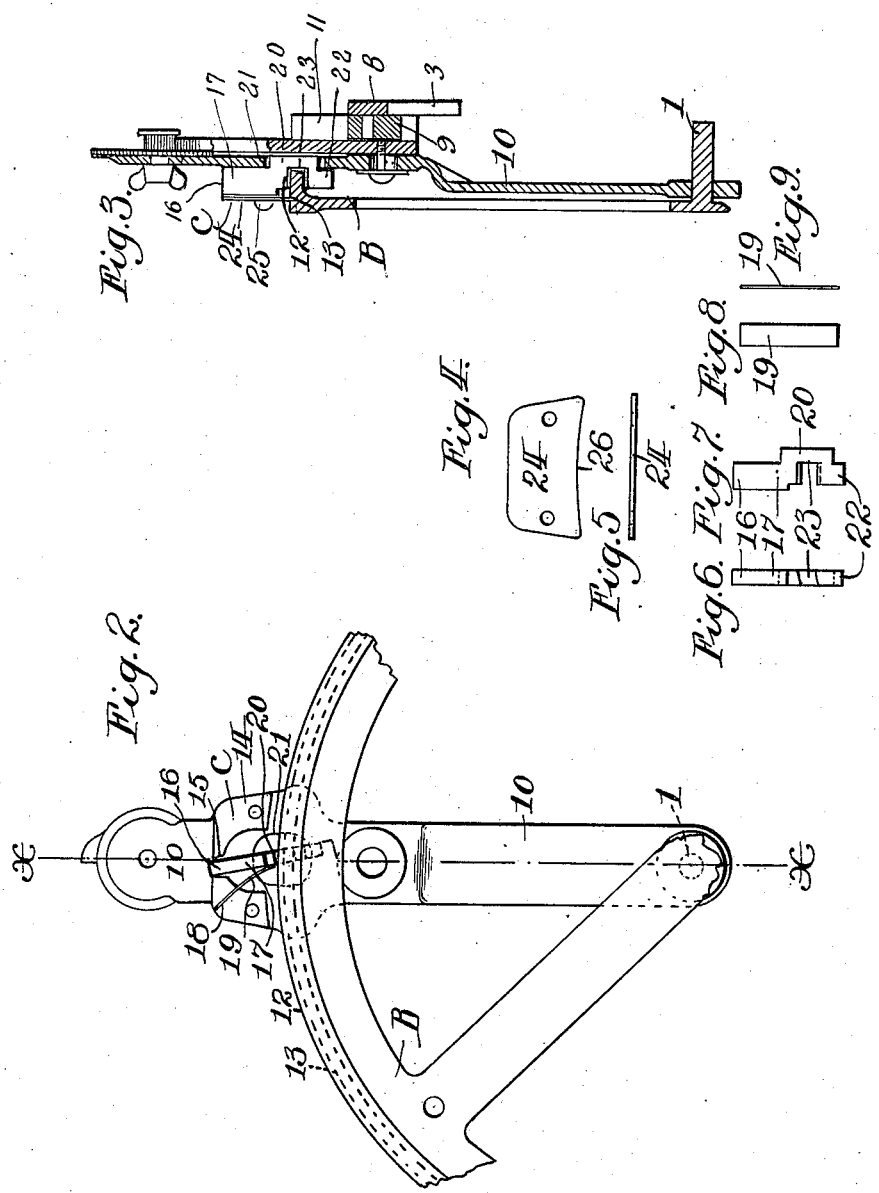
Witnesses:
M. G. Lichtscheidl
S. M. Magaffin
Inventor:
Gustave F. Kriesel,
by John E. Stryker
Attorney.

UNITED STATES PATENT OFFICE.

GUSTAVE F. KRIESEL, OF MINNEAPOLIS, MINNESOTA.

CLUTCH FOR CHEESE-CUTTERS.

1,014,652. Specification of Letters Patent. Patented Jan. 16, 1912.

Application filed July 8, 1907. Serial No. 382,736.

*To all whom it may concern:*

Be it known that I, GUSTAVE F. KRIESEL, a citizen of the United States, residing at Minneapolis, in the county of Hennepin and State of Minnesota, have invented a new and useful Improvement in Clutches for Cheese-Cutters, of which the following is a specification.

My invention relates to improvements in clutches for cheese cutters of that class in which a carrier is provided for the cheese to be rotated under a knife so that a predetermined number of segments may be cut.

The purpose of the invention is to provide a means for feeding or rotating the cheese carrier in a step by step movement in one direction, but to prevent a reverse relative movement of said carrier with respect to the feeding mechanism.

One of the principal defects of devices of this class has heretofore been the liability to reverse movement of the carrier when the operating lever is returned to its normal position after making a stroke and this has been found especially true of carriers which have become worn by use for a considerable period. The construction of my clutch is such that both when new and after hard use its action is positive and accurate and if after long service it becomes worn the engaging member of the clutch may be cheaply and easily replaced without the aid of skilled labor and without substantially interrupting the use of the cheese cutter.

In the accompanying drawings my clutch is shown attached to a cheese cutter described fully in certain Letters Patent issued to me, Patent No. 856,474, granted on the 11th day of June, 1907, which patent is hereby incorporated into and made a part of the present specification, my improvement being particularly designed to operate in connection with the precise arrangement of the parts and elements described in the aforesaid patent, whereby the user of my cheese cutter will be able to obtain the most advantageous use and benefit from it. The clutch which forms the basis of my present improvement occupies the same position in the cheese cutter that the gripping means shown and described in my patent does for which it is a substitution,—namely—it is positioned to the driven member 16, designated the oscillating lever in the present invention. Similarly for all other designations references will be had to the patent aforementioned.

In the drawings Figure 1 is a plan view of the rotary carrier of a cheese cutter with my improved clutch attached; Fig. 2 is a detail showing the clutch and its connections; Fig. 3 is a section of Fig. 2 taken on the line X—X; Fig. 4 is a plan view of the top plate of the clutch; Fig. 5 is an elevation of the same; Fig. 6 is a plan view of the lock bar forming the engaging member of the clutch; Fig. 7 is an elevation of the same; Fig. 8 is an elevation of the spring controlling the lock bar, and Fig. 9 is a plan of said spring.

A is a base upon which the carrier B is centrally journaled by means of the pin 1. The carrier has its bearings on the arms 2 of the base and is held in frictional engagement therewith.

The mechanism for moving the carrier B comprises an operating lever 3 having a handle 4 on its free end and pivoted at its opposite end by means of the bolt 5 in the base A. The lever 3 is provided with an offset 8 carrying a pivoted block 9, the purpose of which is to form a sliding connection between the operating lever and the clutch lever 10 by means of the guides 11 upon the latter. Upon this lever which is journaled upon the pin 1 the clutch C is mounted.

The carrier B is formed with a depending peripheral flange 12 and a groove 13 around its circumference. With this flange 12 the clutch C is adapted to engage. The clutch is composed of a box or casing 14 which may be cast integral with the lever 10 or otherwise attached thereto, said lever having its outer end depressed or in a lower plane than its inner fulcrumed end to permit it passing under the flange 12 of the carrier. The outer wall of this box is mortised at 15 to freely receive the lever arm 16 of the clutch block 17 and is also slit at 18 to receive the spring 19 which impinges against the clutch block 17 and holds it in engagement with the peripheral flange 12 of the carrier. The inner end of the clutch block 17 is formed with a dependent head 20 which projects into the opening 21 in the lever 10, a lug 22 being formed at the inner extremity of the head adapted to rest upon the lever 10. This head 20 has a diagonal slot 23 cut through it adapted to receive the peripheral flange 12 upon the carrier and the action of the spring is to press the clutch block into rigid engagement with the mortised box 14 and at the same time to bring the diagonal opposite corners of the slot 23 in the head 20 into locking contact with the peripheral flange 12 of the carrier. The effect of this arrangement is to permit the carrier to revolve freely from right to left but cause the clutch block 17 to rigidly grip the carrier so that revolution in the opposite direction is impossible. The top plate 24 is attached to the clutch box 14 by means of the screws 25 and the inner edge 26 of the plate is curved to correspond with the circumference of the carrier and fits freely into the groove 13.

It is obvious that my clutch, without departure from the spirit of my invention, may be applied to other cheese carriers and similar rotary mechanism.

Having described my invention, what I claim as new and desire to protect by Letters Patent, is:—

In a device of the character described including a horizontal base, a radial clutch lever having an arc-length movement on said base, a carrier rotatably mounted on said base overlying said clutch lever, and an actuator for said clutch arm comprising a lever pivoted on the base outside the perimeter of the carrier and provided with an offset arm slidably connected to said clutch lever, a clutch block interposed between said carrier and radial clutch lever, said clutch lever having a depressed outer end spaced from the carrier and forming a seat for said clutch block, a flange formed upon said carrier for entering a diagonal slot in said clutch block, the corners of which slot engage with and move said flange when the clutch lever is actuated in one direction, said clutch lever having an aperture to receive a depending lug on said clutch block, which block bears upon said clutch arm at opposite sides of said flange, a housing for said clutch block, said housing embracing a member guiding said flange in its socket and carrying a spring bearing against said block to hold it in operative position.

In testimony whereof I have signed my name to this specification in the presence of two subscribing witnesses.

GUSTAVE F. KRIESEL.

Witnesses:
W. H. WILLIAMS,
M. G. LICHTSCHEIDL.

Copies of this patent may be obtained for five cents each, by addressing the "Commissioner of Patents, Washington, D. C."